United States Patent [19]

Eichenauer et al.

[11] Patent Number: 5,225,465
[45] Date of Patent: Jul. 6, 1993

[54] PROCESS FOR WORKING UP STABILIZED ABS POLYMERS WITH RECOVERY OF UNREACTED MONOMERS

[75] Inventors: Herbert Eichenauer; Ulrich Jansen, both of Dormagen; Ralph Ostarek, Duesseldorf; Otto Koch, Cologne; Karl-Heinz Ott, Leverkusen, all of Fed. Rep. of Germany

[73] Assignee: Bayer Aktiengesellschaft, Leverkusen, Fed. Rep. of Germany

[21] Appl. No.: 864,302

[22] Filed: Apr. 6, 1992

[30] Foreign Application Priority Data

Apr. 19, 1991 [DE] Fed. Rep. of Germany ....... 4112789

[51] Int. Cl.$^5$ .................. C08J 11/02; C08K 5/36
[52] U.S. Cl. .................. 524/100; 524/326; 524/368; 524/392
[58] Field of Search ........... 525/316; 524/303, 304, 524/343, 828, 368, 392, 100, 326

[56] References Cited

U.S. PATENT DOCUMENTS 2,944,086 7/1960 Coffield et al. ............ 524/343

FOREIGN PATENT DOCUMENTS 1266491 4/1968 Fed. Rep. of Germany.

Primary Examiner—Veronica P. Hoke
Attorney, Agent, or Firm—Connolly and Hutz

[57] ABSTRACT

A process for processing polymers of the ABS type present in emulsion form and effectively stabilized against oxidative attack with optionally continuous recovery and direct reuse of untreated monomers, wherein a combination of at least one phenolic antioxidant having a molecular weight above 300 without ester groups in the molecule and at least one sulfur-containing co-stabilizer having a molecular weight above 500 without ester groups in the molecule is added to the ABS polymer emulsion for stabilization against oxidative degradation.

1 Claim, No Drawings

PROCESS FOR WORKING UP STABILIZED ABS POLYMERS WITH RECOVERY OF UNREACTED MONOMERS

ABS polymers are elastic-thermoplastic products which are made up mainly of the monomer units acrylonitrile, butadiene and styrene. There is a distinction between ABS polymers prepared by emulsion polymerization and ABS polymers synthesized by bulk polymerization (cf. for example Ullmanns Enzyklopädie der technischen Chemie, 4th Edition, 1980, Vol. 19, Chapter 5 and the references cited therein).

In the production of ABS polymers by emulsion polymerization, a monomer mixture of styrene (or optionally α-methyl styrene) and acrylonitrile is copolymerized in the presence of polybutadiene in latex form (or optionally a copolymer of butadiene with, for example, styrene or acrylonitrile as comonomer), so that part of the styrene/acrylonitrile copolymer formed is chemically bonded to the polybutadiene in the form of grafted-on polymer chains.

Stabilizers have to be added to the polymers thus prepared to ensure effective protection against oxidative degradation of the rubber during processing from the latex (coagulation, drying), compounding (addition of additives, dyes etc. under thermoplastic conditions), shaping (for example by injection moulding or extrusion) or during the use of the end products (for example in thermally stressed parts).

In order to utilize the full effect of these stabilizers already when the ABS polymer is first subjected to thermal stress, i.e. in drying the moist polymer powder, the stabilizers are added before the actual drying step. To ensure uniform distribution, the stabilizers have to be added to the latex.

As complete reaction of the monomers cannot be achieved in the emulsion polymerization of ABS on an industrial scale, and as monomers remaining in the latex signify a reduction in yield and, if left in the finished ABS polymer, cause deterioration of properties (for example streaks and other surface defects are found on mouldings produced therefrom, and heat resistance is lower), any monomers still present must be completely removed.

This can be done, for example, by subsequent treatment of the latex with a polymerization-initiator (generally a radical former, for example a peroxide) or by application of a vacuum (removal of the monomers by distillation).

However, these methods used to remove the monomers reduce the stability of the latex (partial coagulation); a stabilizer already added may loose its effect or may be removed together with the monomers. The monomers removed have to be subjected to complicated and expensive separation and cleaning steps before being reused or have to be expensively disposed of.

The present invention relates to a process for processing polymers of the ABS type present in emulsion form and effectively stabilized against oxidative attack with optionally continuous recovery and direct reuse of unreacted monomers, wherein a combination of at least one phenolic antioxidant having a molecular weight above 300 and preferably above 350 without ester groups in the molecule and at least one sulfur-containing co-stabilizer having a molecular weight above 500 and preferably above 800 without ester group in the molecule is added to the ABS polymer emulsion for stabilization against oxidative degradation, the monomers are subsequently removed from the emulsion or from a mixture of emulsion and coagulated suspended polymer or from completely coagulated suspended polymer, the remaining stabilized ABS polymer is freed from unreacted monomers, is processed in the usual way and the monomers removed are recycled without any further treatment in the polymerization process.

Polymers of the ABS type present in emulsion form which are suitable for use in accordance with the invention are polymers which have been obtained by radical polymerization of vinyl compounds, preferably selected from styrene, α-methyl styrene, acrylonitrile, methacrylonitrile, methyl methacrylate, and mixtures thereof in the presence of a rubber having a glass transition temperature $\leq 10°$ C. present in latex form, preferably polybutadiene, copolymers of butadiene and styrene and/or acrylonitrile, polybutyl acrylate. Preferred rubbers are partly crosslinked particulate rubbers having average particle diameters ($d_{50}$) of 50 to 1,000 nm and preferably 80 to 500 nm. Particularly preferred ABS-polymers are obtained by polymerization of a mixture of styrene and acrylonitrile, preferably in a ratio by weight of 90:10 to 60:40, in the presence of polybutadiene, the polybutadiene content after polymerization being from 5 to 90% by weight and preferably from 20 to 85% by weight. Polymers such as these are known.

Emulsion-form mixtures of the above-described polymers of the ABS type with polymers obtained by radical polymerization of styrene, α-methyl styrene, acrylonitrile, methacrylonitrile, methyl methacrylate or mixtures thereof are also suitable for use in accordance with the invention. Preferred polymers of this type latex-form copolymers of styrene and acrylonitrile or of α-methyl styrene and acrylonitrile, more preferably made up of 90 to 60% by weight styrene or α-methyl styrene and 10 to 40% by weight acrylonitrile.

The emulsion-form polymers of polymer mixtures may be prepared in known manner by emulsion polymerization in aqueous media. The monomers are radical-polymerized in aqueous medium at pH values of approx. 12 to 2 and, more particularly, 10 to 4 with the assistance of emulsifiers. Suitable initiators are, in particular, water-soluble radical formers, such as peroxodisulfates, peroxodiphosphates, water-soluble hydroperoxides and peroxo acids. Redox initiator systems are also suitable. The polymerization, which is normally carried out at 40° to 90° C., requires the presence of an ionic emulsifier, more particularly an anionic emulsifier, in quantities of up to 4% by weight and preferably up to 2.5% by weight, based on the monomers. Suitable emulsifiers are, for example, fatty acid salts (for example potassium oleate), alkyl sulfonic acid salts having relatively long-chain alkyl radicals, sulfuric acid alkyl semi-esters with relatively long-chain alkyl radicals and, preferably, alkali metal salts of disproportionated abietic acid.

The polymer emulsions thus prepared generally have polymer solids contents of 10 to 70% by weight and preferably 25 to 50% by weight. The percentage content of nonpolymerized monomers in the latex is generally 0.2 to 10% by weight, preferably 0.3 to 5% by weight and, more preferably, 0.3 to 3% by weight (based on polymer solids in the latex).

Stabilizers suitable in accordance with the invention are sterically hindered phenols having molecular weights above 300 and preferably above 350 with no ester group in the molecule.

Examples of suitable sterically hindered phenols are 2,2'-methylene-bis-(4-methyl-6-tert.-butylphenol), 2,2'-methylene-bis-(4-ethyl-6-tert.-butylphenol), 4,4'-butylidene-bis-(3-methyl-6-tert.-butylphenol), 2,2'-methylene-bis-(4-methyl-6-cyclohexylphenol), di-(3-tert.-butyl-4-hydroxy-5-methylphenyl)-dicyclopentadiene, tris-(2-methyl-4-hydroxy-5-tert.-butylphenyl)-butane, 4,4'-thio-bis-(6-tert.-butyl-3-methylphenol), 2,4-bis-(n-octylthio)-6-(4-hydroxy-3,5-di-tert.-butylanilino)-1,3,5-triazine.

Preferred compounds are 2,2'-methylene-bis-(4-methyl-6-tert.-butylphenol) and 2,2'-methylene-bis-(4-methyl-6-cyclohexylphenol). Sulfur-containing co-stabilizers suitable in accordance with the invention, which may be used in combination with the sterically hindered phenols, are compounds containing at least one sulfur atom incorporated in the form of a thioether group which have molecular weights above 500 and preferably above 800 and no ester group in the molecule.

Examples of suitable sulfur-containing co-stabilizers are addition products of long-chain mercaptans with monoolefins, diolefins, aromatic monovinyl compounds or aromatic divinyl compounds or sulfur-containing compounds obtained by reaction of monomers with mercaptans under polymerization conditions (cf. DE-OS 3 505 747). Preferred sulfur-containing co-stabilizers are the compounds produced in accordance with DE-OS 3 505 747.

The stabilizer components are preferably incorporated in the polymer emulsion by pre-emulsification of the components and subsequent intensive mixing with the ABS emulsion to be stabilized.

The monomers can be removed by distillation, preferably at temperatures of 50° C. to 120° C. They may be removed from the latex, from a mixture of latex and coagulated suspended polymer or from completely coagulated suspended polymer. The treatment of latex with steam is often accompanied by partial coagulation of the latex so that a corresponding mixture is then present. The monomers are preferably removed in accordance with DE-OS 2 909 518.

According to the invention, the monomers thus recovered, which initially are in admixture with water, may be used in another polymerization process without any need for further treatment to remove secondary constituents adversely affecting the polymerization process.

It is possible either to reuse the monomer/water mixture directly in the polymerization process or to separate monomer phase and aqueous phase.

The aqueous phase, which may still contain water-soluble monomers, for example acrylonitrile, can also be reused in another polymerization process. In this way, it is possible to reduce the quantity of fresh water otherwise required for emulsion polymerization. This also obviates disposal of monomer-laden water. To avoid the need for expensive drying, the monomers recovered are preferably used in aqueous emulsion polymerizations and, more preferably, in the production of more ABS polymers.

The recovery of the monomers or the monomer/water mixture and reuse in a polymerization reaction are preferably continuous, but may also be carried out in batches.

The proportion of the recovered monomers reused in new polymerization reactions is between 0.1 and 50% by weight, preferably between 0.25 and 25% by weight and more preferably between 0.5 and 10% by weight (based on the total quantity of monomers used in the polymerization).

The ABS polymers freed from the unreacted monomers may be processed by standard methods. For example, the mixture of water and polymer suspended therein, which is present after coagulation, may be separated by filtration or centrifugation and the moist ABS polymer subsequently dried by known methods.

The ABS polymers processed in accordance with the invention show excellent stability to oxidative degradation under thermal stressing. They may be dried under thermal stressing with no adverse effect on their properties, particularly in the form of unwanted discoloration, mixed while heating with additives or other polymers under thermoplastic conditions and subjected to thermoplastic processing.

In addition, the ABS polymers processed in accordance with the invention have very small residual monomer contents. The ABS polymers worked up in accordance with the invention may be processed as pure substances, although a compounding step is normally introduced, in which processing aids (for example lubricants, mould release agents), other additives (for example light stabilizers, flameproofing agents, fillers) or other polymer components (for example styrene/acrylonitrile copolymers, α-methyl styrene/acrylonitrile copolymers, polycarbonates, for example based on bisphenol A, polyesters, for example polyethylene terephthalate or polybutylene terephthalate, polyamides, for example polyamide 6 or polyamide 66, polyvinyl chloride, may be incorporated. Suitable processing machines are, for example, injection-moulding machines, extruders or blow moulding machines.

EXAMPLES

Materials used

A) Latex of an ABS polymer prepared by radical emulsion polymerization of 50 parts by weight of a monomer mixture of 72% by weight styrene and 28% by weight acrylonitrile in the presence of 50 parts by weight of a latex-form polybutadiene having an average particle diameter ($d_{50}$) of 400 nm using the sodium salt of disproportionated abietic acid as emulsifier, solids content 32.5% by weight, residual monomer content 1.2% by weight.

B) Latex mixture of 25% by weight of the latex described in (A) and 75% by weight of a latex of a copolymer prepared by radical emulsion polymerization of 70 parts by weight α-methyl styrene and 30 parts by weight acrylonitrile using the sodium salt of $C_{9-18}$ alkyl sulfonic acids as emulsifier, solids content 31.8% by weight, residual monomer content 1.8% by weight.

C) 2,2'-Methylene-bis-(4-methyl-6-cyclohexylphenol)—Vulkanox® ZKF, a product of Bayer AG—as phenolic antioxidant.

D) 2,2'-Methylene-bis-(4-methyl-6-tert.-butylphenol)—Vulkanox® BKF, a product of Bayer AG—as phenolic antioxidant.

E) 2,6-Di-tert.-butyl-4-methylphenol—Vulkanox® KB, a product of Bayer AG—as phenolic antioxidant.

F) Octadecyl-3-(3,5-di-tert.-butyl-4-hydroxyphenyl)-propionate—Irganox® 1076, a product of Ciba Geigy—as phenolic antioxidant.

G) Latex-form product prepared by radical emulsion polymerization of 61.2 parts by weight styrene, 23.8 parts by weight acrylonitrile and 15 parts by weight tert. dodecyl mercaptan in accordance with DE-OS 3 505 747, Example 1, as sulfur-containing co-stabilizer.
H) Dilauryl thiodipropionate—Irganox PS 800, a product of Ciba Geigy—as sulfur-containing co-stabilizer.

Procedure for Carrying out the Tests

I) General procedure for the preparation of a stabilizer-containing aqueous emulsion 50 Parts by weight stabilizer (C, D, E, F or H) are melted together with 15 parts by weight of the sodium salt of disproportionated abietic acid and slowly added with vigorous stirring to 60 parts by weight water heated to 80° C. After vigorous stirring for another 2 minutes, the stabilizer is uniformly distributed and the resulting emulsion, which has an active substance content of 40% by weight, is directly stirred into the ABS latex to be stabilized.

II) General procedure for the removal of monomers from the stabilized ABS latex and working up of the ABS polymer The quantities of stabilizer shown in Table 1 are added to the latex described in (A) or (B) and stirred for 2 h at room temperature in order uniformly to disperse the stabilizer emulsion. 300 Parts by weight latex are then added with intensive stirring to 500 parts by weight of a hot (99° to 100° C.) aqueous 2% magnesium sulfate solution adjusted with acetic acid to a pH value of 2.5 to 3, a mixture of monomer and water being distilled off during and after the coagulation process. The ABS suspension then present is filtered, after which the polymer is washed with water and subsequently dried in vacuo.

III) Procedure for carrying out a model reaction 1 to evaluate the polymerization behavior of the monomers removed during working up A mixture of 5.4 parts by weight styrene, 2.1 parts by weight acrylonitrile and 0.15 part by weight of the sodium salt of disproportionated abietic acid is dispersed while stirring in 81.8 parts by weight water and, after heating to 65° C., 0.15 part by weight potassium persulfate (dissolved in 13.2 parts by weight water) is added to the resulting dispersion. After stirring for 30 minutes at the temperature of 65° C., a mixture of 66.6 parts by weight styrene and 25.9 parts by weight acrylonitrile and, through a separate inlet, a solution of 1.85 parts by weight of the sodium salt of disproportionated abietic acid in 25 parts by weight water is added to the reaction mixture over a period of 4 hours. After a reaction time of 2 h at 65° C., the conversion of the monomer mixture is determined by measuring the amount of polymer formed.

To evaluate the polymerizability of the monomers removed in accordance with (II) and to determine the effect of the monomers removed on the polymerization reaction, either 5% by weight or 10% by weight of the quantities of styrene mentioned above were replaced by monomer which had been removed.

IV) Procedure for carrying out a model reaction 2 to evaluate the polymerization behavior of the monomers removed during working up A mixture of 2.7 parts by weight styrene, 1.05 parts by weight acrylonitrile and 0.15 part by weight of the sodium salt of disproportionated abietic acid is mixed with 102 parts by weight of a polybutadiene latex (solids content 49.2% by weight, average particle diameter ($d_{50}$) of the polybutadiene particles 0.4 μm) and 100 parts by weight water and, after heating with stirring to 65° C., 0.15 part by weight potassium persulfate (dissolved in 19.8 parts by weight water) is added to the resulting mixture. After stirring for 30 minutes at the temperature of 65° C., a mixture of 33.3 parts by weight styrene and 12.95 parts by weight acrylonitrile and, through a separate inlet, a solution of 1.85 parts by weight of the sodium salt of disproportionated abietic acid in 25 parts by weight water are added to the reaction mixture over a period of 4 hours. After a reaction time of 2 h at 65° C., the conversion of the monomer mixture is determined by measuring the amount of polymer formed.

To evaluate the polymerizability of the monomers removed in accordance with (II) and to determine the effect of the monomers removed on the polymerization reaction, either 5% or 10% of the quantities of styrene mentioned above were replaced by monomer which had been removed.

V) Evaluation of the stability of the ABS polymer worked up in accordance with (II)

The polymer powder left after drying was heated in air for 10 minutes at 200° C., after which the powder was visually evaluated. The powder was evaluated on the following scale:
1 = no change
2 = slight yellowing
3 = serious yellowing The tests carried out and the results obtained are shown in Table 1.

TABLE 1

| Example | ABS polymer used | Phenolic* antioxidant (parts by wt. per 100 parts by wt. ABS) | Sulfur-containing** co-stabilizer (parts by wt. per 100 by wt. ABS) | Quantity of recovered monomer used in model reaction III or IV | Resulting conversion in model reaction III or IV | Stability of the ABS polymer |
|---|---|---|---|---|---|---|
| 1 | A | C (1) | G (3) | 5% (III) | 99.5 | 1 |
| 2 | A | C (1) | G (3) | 10% (III) | 99.3 | 1 |
| 3 | A | C (1) | G (3) | 5% (IV) | 99.3 | 1 |
| 4 | A | D (0.87) | G (3) | 10% (III) | 99.1 | 1 |
| 5 | B | D (0.87) | G (3) | 5% (IV) | 98.8 | 1 |
| 6 | B | C (1) | G (3) | 10% (III) | 98.5 | 1 |
| 7 | B | C (1) | G (3) | 5% (IV) | 99.0 | 1 |
| 8 (Comparison) | A | E (1.12) | G (3) | 5% (III) | No reaction | 2 |
| 9 (Comparison) | A | E (1.12) | G (3) | 10% (III) | No reaction | 2 |
| 10 (Comparison) | A | F (2.7) | G (3) | 10% (III) | 93.5 | 1 |
| 11 (Comparison) | A | C (1) | H (1.15) | 10% (III) | 94.6 | 2 |
| 12 (Comparison) | A | E (1.12) | H (1.15) | 10% (III) | No reaction | 3 |

TABLE 1-continued

| Example | ABS polymer used | Phenolic* antioxidant (parts by wt. per 100 parts by wt. ABS) | Sulfur-containing** co-stabilizer (parts by wt. per 100 by wt. ABS) | Quantity of recovered monomer used in model reaction III or IV | Resulting conversion in model reaction III or IV | Stability of the ABS polymer |
|---|---|---|---|---|---|---|
| 13 (Comparison) | B | R (1.12) | H (1.15) | 5% (IV) | 15.3 | 3 |

*The content of active groups (sterically hindered OH groups) was kept constant
**The content of active groups (—S— groups) was kept constant.

It can clearly be seen that effectively stabilized ABS polymers and unreacted monomers with very good polymerization behavior recovered therefrom are only obtained at one and the same time where the process according to the invention is applied or where the special stabilizer combinations are used in the application of the process according to the invention.

I claim:

1. A process for processing ABS polymers in emulsion form, which comprises adding to the ABS polymer emulsion a combination of at least one phenolic antioxidant having a molecular weight above 300 without ester groups in the molecule and at least one sulfur-containing costabilizer having a molecular weight above 500 without ester groups in the molecule for stabilization against oxidative degradation, removing monomers from the emulsion or from a mixture of emulsion and coagulated, suspended polymer or from completely coagulated suspended polymer to free the stabilized ABS polymer from unreacted monomers, recovering the polymer, and recycling the removed monomers without any further treatment into the polymerization process.

* * * * *